United States Patent [19]

Cummins

[11] Patent Number: 5,110,610
[45] Date of Patent: May 5, 1992

[54] DOUGH PIECE ROUNDER AND METHOD

[75] Inventor: Donald L. Cummins, Mechanicsville, Va.

[73] Assignee: AMF Machinery Systems, Inc., Richmond, Va.

[21] Appl. No.: 672,934

[22] Filed: Mar. 21, 1991

[51] Int. Cl.⁵ .......................... A21D 6/00; A21C 9/00
[52] U.S. Cl. .................................. 426/496; 425/241; 425/332; 425/364 R; 426/503
[58] Field of Search ............... 426/496, 503, 516; 425/241, 332, 333, 363, 364

[56] References Cited

U.S. PATENT DOCUMENTS

| | | | |
|---|---|---|---|
| 2,858,775 | 11/1958 | Marasso | 425/241 |
| 3,521,578 | 7/1970 | Fraioli | 425/332 |
| 4,948,611 | 8/1990 | Cummins | 426/516 |
| 4,960,601 | 10/1990 | Cummins | 425/204 |

FOREIGN PATENT DOCUMENTS 2159090 11/1985 United Kingdom ............... 425/241

*Primary Examiner*—George Yeung
*Attorney, Agent, or Firm*—Staas & Halsey

[57] ABSTRACT

A dough piece rounder and method where the belt used for conveying the dough pieces past the rounder bar is supported by a thin film of air between the underside of the conveyor belt and a perforated plate which forms the upper flat side of a plenum chamber. The principal part of the apparatus is supported on a horizontal cantilever cylinder so that the belt can be readily replaced from one side and the apparatus can be tilted so that the inlet and exit of the dough pieces can be at different levels.

16 Claims, 4 Drawing Sheets

DOUGH PIECE ROUNDER AND METHOD

This invention relates to a dough piece rounder and method for taking a uniformly weighted piece of dough that has been divided from a larger piece and rounding it into a more spherical shape.

Typical of the manufacturing of buns and rolls for the baking industry is a system whereby dough is divided into smaller uniformly weighted pieces and subsequently processed through a device called a rounder.

The rounder is a conveyor belt of suitable width upon which are positioned rounder bars set at an oblique angle to the travel of the conveyor belt. The laterally spaced dough pieces advance into the inlets of the rounder bars and are forced into the concavity along the length of the rounder bar. The concavity along the length of the rounder bar has evolved over the decades of use into artfully designed shapes to suit the purposes of the industry relative to the characteristics of dough and the size of the dough pieces.

The lower edge of the rounder bars form a contact seal against the conveyor belt much as a scraper and cause the dough pieces to roll obliquely while advancing down the rounder device. This forms a gluten structured skin over the dough piece and aids in the retention of subsequent gases that will form in the dough piece. This retention of gases and the uniformly rounded shape of the dough piece is required with subsequent processes to produce a desired bun or roll of given characteristics.

With the ever increasing demand for faster production of buns for the fast food industry, the state of the art divider is now capable of dividing (8) pieces of dough per cut of a cutoff device that is cutting at a rate of (150) cuts per minute. This gives a total dough piece output of (1200) pieces of dough per minute possible with state of the art dividers recently introduced by the owner of this application.

It has been found that the subsequent rounding operation running at this rate of speed causes heat to build up at the juncture of the rounder bar lower edges where they contact the conveyor belt. This in turn causes the dough pieces to stick and advance down the rounder bars at a nonuniform rate causes a percentage of the dough pieces to join each other in what is called doubling and requires that the doubled piece of dough either be reprocessed of discarded. In addition, this problem is labor intensive and causes inefficiencies in the manufacture of buns and rolls. Also, the hot surfaces cause the dough pieces to stick to the belt and rounder bar surfaces and increases leakage of the rounder bars under the seal of the lower edge and the conveyor belt.

The prior art is represented by U.S. Pat. No. 2,858,775, issued Nov. 4, 1958 and titled "Dough Handling Machine" which is incorporated herein by reference.

BRIEF DESCRIPTION OF THE INVENTION

The object of this invention is to accommodate the higher speeds of production of buns and rolls by reducing the heat buildup of the rounder and form a better seal between rounder bar and conveyor belt. This in turn will increase efficiencies and make the state of the art of the rounder device and method comparable to the speed capabilities of the state of the art dividers.

The invention provides a chamber within the rounder table on top of which a perforated deckplate is positioned. The deckplate forms the surface over which the conveyor belt rides during the rounding operation.

The chamber and the perforated deckplate over which the conveyor belt rides are then brought to a positive pressure by means of a regenerative blower capable of providing dry, clean, oil free air at several inches of $H_2O$ pressure.

This positive pressure partially sealed off at the perforations by the conveyor belt and in consideration of the large area under the belt, will provide an air bearing under the belt by raisin the belt off the deckplate by several thousands of an inch. The reduction of the friction between the belt and the deckplate reduces heat buildup and the excess air that escapes about the edges of the belt dissipates much of the heat that is generated where the rounder bar edges is proximate tot he conveyor belt at an oblique angle.

A pressure and air volume regulating means is provided on the pressure chamber in the form of an adjustable vent.

DESCRIPTION OF THE PREFERRED EMBODIMENT

In this description, including the accompanying drawing, there is shown and described a preferred embodiment of the invention and suggested various alternatives and modifications thereof, but is to be understood that these are not intended to be exhaustive and that other changes and modifications can be made within the scope of the invention. These suggestions herein are selected and included for purpose of illustration in order that others skilled in the art will more fully understand the invention and the principles thereof and will be able to modify it and embody it in a variety of forms, each as may be suited in the conditions of a particular case.

DETAILED DESCRIPTION OF THE INVENTION

Figure 1:
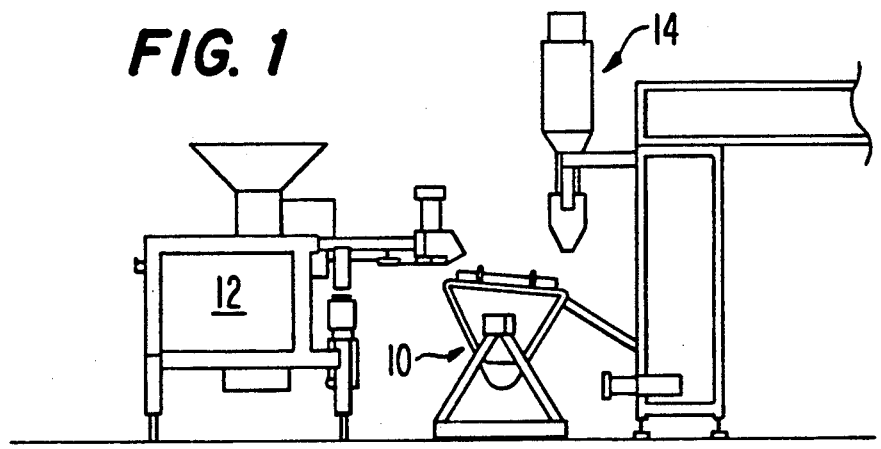
FIG. 1 shows a schematic broken away section of a bun production line showing the location of the invention therein.

With reference to FIG. 1, there is shown the dough piece divider apparatus for extruding and accurately cutting off dough in predetermined sizes is shown at 12. This apparatus does not form part of the present invention and is shown in U.S. Pat. Nos. 4,948,611 and 4,960,601. This apparatus provides dough pieces of uniform size without lubrication and places the pieces on to the dough piece rounder 10 where they are rounded into spherical shapes before being passed to the next work station which includes an optional flour recovery system 14.

A typical dough piece rounder prior to this invention is shown in U.S. Pat. No. 2,858,775 issued on Nov. 4, 1958 in the name of F. D. Marasso.

Figure 2:
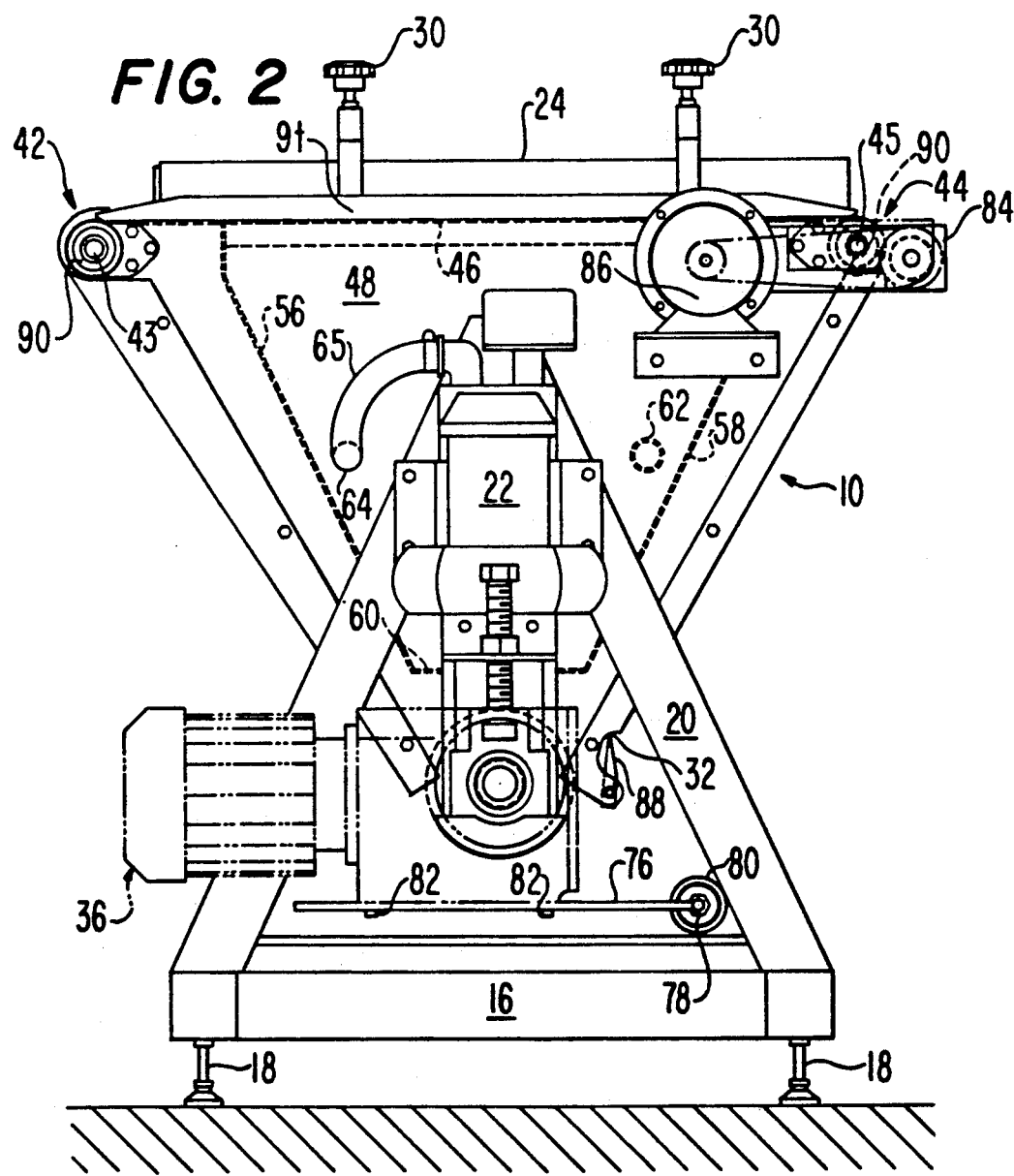
FIG. 2 shows a side view of the invention.
Figure 3:
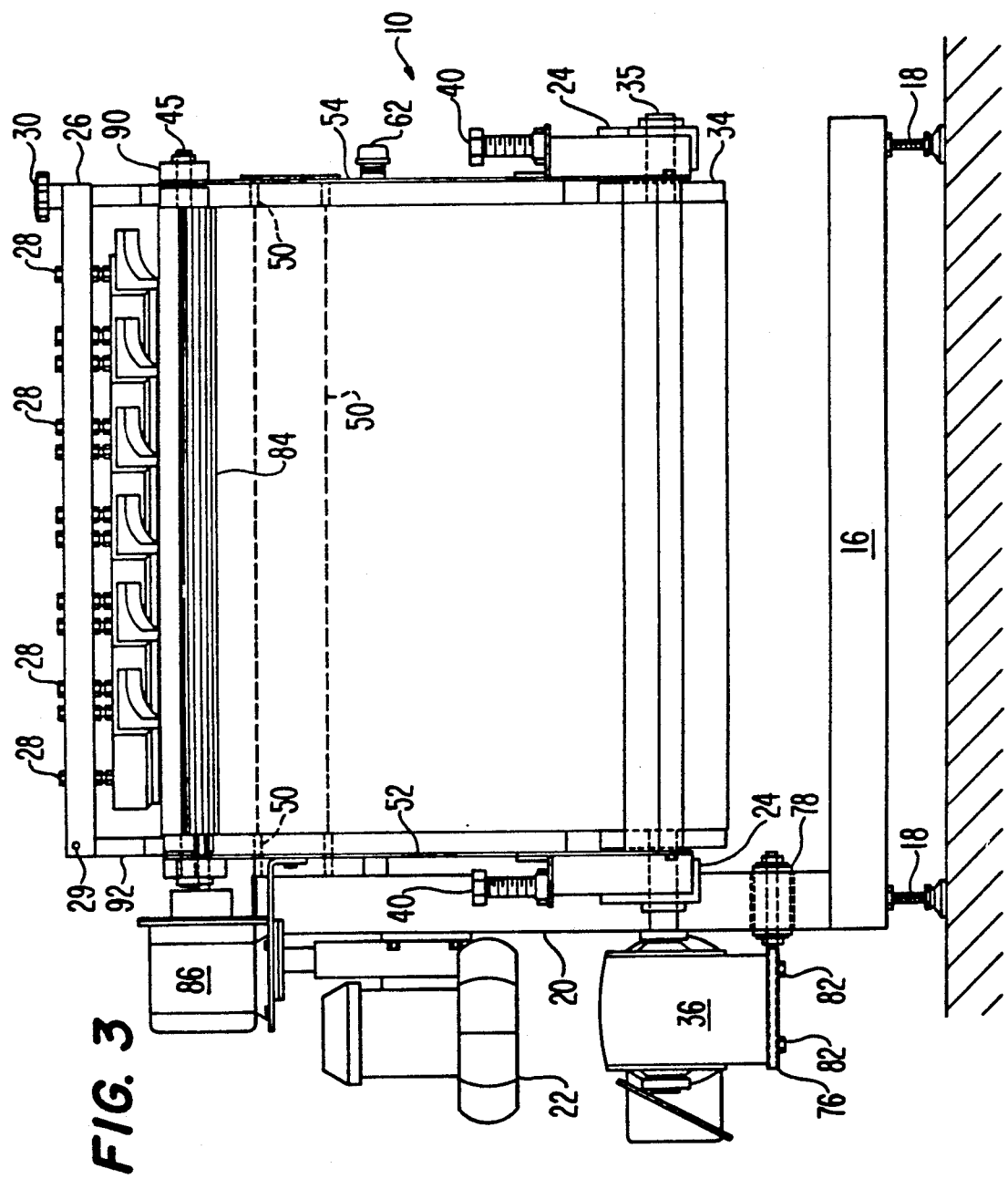
FIG. 3 shows an end view of the invention.

With reference to FIGS. 2 and 3 the present apparatus includes a frame 16 mounted on four adjustable leveling pads 18. The frame 16 includes two frame uprights 20 which lie in the same vertical plane at the side of the base frame 16 and converge upwardly toward one another to form an inverted V. At the apex of the frame upright 20 is attached a regenerative air blower 22.

Those familiar with dough rounders will recognize that the size of the rounder of the present invention is quite small and yet it is capable of running high production and maintaining the temperatures of the belt carrying the dough piece sufficiently low to produce a good product. This is permitted in part by using a bun extruder and divider such as shown in U.S. Pat. Nos. 4,948,611 and 4,960,601 which provides an extruded dough piece that uses no oil. The fact that the dough pieces are not oiled allows the dough to be rounded over a shorter distance but because of no oil there is a tendency for more heat to be built up.

One of the principal advantages of the present invention is to prevent a build up of heat. For example, prior rounding bars may create temperatures of the base plate as high 130-135 degrees, whose temperatures are extremely hot and represent about the limit of what a person can touch and withstand the pain of the heat. In contrast, the present invention only causes a few degrees of temperature rise above that of ambient temperature.

Figure 4:
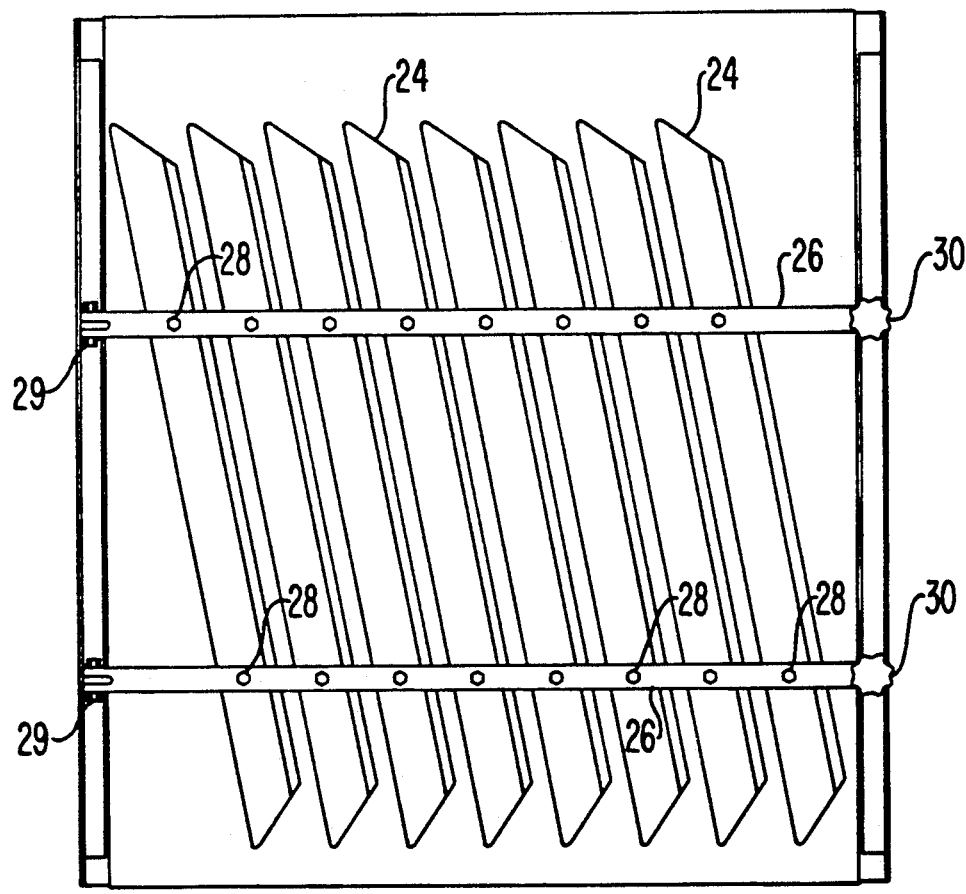
FIG. 4 shows a top view of the invention.

The apparatus shown in FIGS. 3 and 4 show six and eight rounder bars 24, respectively, but this apparatus can be changed to ever how many rounder bars are needed. If more than eight rounder bars are needed, the apparatus can be widened to accommodate the increased numbers. The number of rounder bars are chosen to match the number of dough pieces being presented by dough delivery extruder and cutter apparatus 12. The rounder bars 24 are supported by two cross members 26 and are held to the cross members by vertically adjustable nut and bolt assemblies 28. The vertical adjustment of the rounder bars 24 by adjustment nut and bolt assemblies 28 is to position them so as to impinge on the surface of the conveyor belt 32. The impingement of the rounder bar on the surface of the conveyor belt forms a seal so the dough pieces rolling down the bar at an oblique angle don't leak under the edge of the rounder bar.

Cross member supports 26 are pivoted at one end around pivot point 29 and locked down at the other end by wheel 30.

In the absence of the present invention, which provides a cooling film of air under the conveyor belt and also an air support for the conveyor belt, the rounder bar would press the belt against the steel backplate and heat would build up rapidly. However, utilizing the present invention, this heat only builds to a few degrees above ambient temperature.

The conveyor belt is readily available from numerous vendors and the preferred one used at the present time is a white neoprene surface on a polyester weave with a total thickness of approximately 0.090". The belt is continuous following a triangular path as shown in FIG. 2 and the particular dimensions shown is approximately 39-40" wide.

The conveyor belt is known in the bakery industry as a slick belt and since it is made of polyester cord it has very little stretch and is coated with various coatings provided by the belt companies to provide wear and other characteristics desired. At the moment the preferred belt coating is a white neoprene with some urethane alloy. The preferred belt is model number Ultra Kool II made by Sparks Belting of Charlotte, N.C. The speed of the belt is chosen to run at speeds that can accommodate the dough delivery extruder and cutter which in a preferred example is about 150 cuts a minute which would indicate a surface speed of the belt to run in excess of 250 feet per minute which is relatively high speed and since the rounding bars are relatively short, the dough pieces transfer across the top of the conveyor belt at a very high rate of speed. This would produce approximately 900 pieces of rounded dough a minute when using six rounding bars.

The belt is driven by drive roll 34 which is preferably 6" in diameter, made of steel with a white neoprene coating on the steel to maintain enough traction to cause the conveyor belt to move against the friction of the rounding bars. The conveyor belt drive roll 34 is driven by a 3 horsepower gear motor with an output of approximately 80 to 150 revolutions per minute. The variable speed gear motor is available from a number of sources and the one used is Sew-Eurodrive, Inc. of Lyman, S.C.

The neoprene coated drive roll 34 is mounted on suitable adjustable bearings 38 having adjustment screws 40 would permit adjustment to take up any slack in the conveyor belt 32 and to maintain the tracking of the belt around its triangular path. The drive roll 34 is mounted on a 10½" diameter drive shaft 35.

The conveyor belt is also supported by two idler rolls 42 and 44. These are two rollers at the top which are simply lined for parallelism during assembly of the apparatus and are non-adjustable. They are simply steel surface rollers and do not have to be specially coated since they merely support the conveyor belt and do not have a driving function.

The idler roll 42 and 44 are mounted on ⅜" diameter idler shafts 43 and 45 respectively. The idler shafts 43 and 45 are supported at each end on flange bearings 90.

The two idler rolls, 42 and 44, have their topmost position tangent with the plane of the surface of the perforated deckplate 46.

The perforated deckplate 46 forms the top side of a triangular plenum chamber 48. This triangular, or delta plenum chamber, is mounted in a cantilevered fashion about a pipe 50 extending from the top of the A frame formed by the frame uprights 20. This forms a cantilevered tubular support and provides a convenient pivot which does several things.

First, it is a convenient way to adapt the apparatus to several machines of different heights easily. Second, it provides a quick and easy means for replacing the conveyor belt which follows a delta pattern as it continuously is driven to convey the dough pieces past the rounder bars. Since this belt is mounted in a cantilevered fashion, it is easily removed by loosening the adjustment screws on the lower drive roll 34 and removing the bars and slipping the belt off the delta plenum chamber. This quick removal is critical in a bakery because from time to time foreign objects get between the rounder bars and the conveyor belt and destroy them and since the dough must be used in a relatively short period of time or thrown away, the belt must be changed in a hurry. The triangular or delta plenum chamber is in effect a metal container preferably made of a welding fabrication with a continuous weld on four sides, plus the fifth upper side which is the perforated deckplate. The four sides are two vertical flat plates 52 and 54 and two inclined plates 56 and 58. The bottom of the plenum chamber is truncated by an additional plate 60.

The plenum chamber is airtight except for the perforations and the perforated deckplate 46 and two 10¼" diameter pipe openings 62 and 64. Pipe opening 64 is connected to the regenerative blower by conduit 65. The regenerative blower 22 is essentially a two stage blower that provides sufficient air into inlet pipe opening 64.

The plenum chamber is maintained at a positive pressure of several inches of water pressure during the leakage of air through the large surface area of the perforated deckplate 46 which leakage provides enough air to act as an air bearing and also cool the belt. The two-staged blower is preferably a typical centrifugal blower.

The outlet pipe opening 62 is either closed off or used to connect to a pressure regulator to act as a relief vent or discharge to control the pressure. The mechanism for providing the relief is not shown in the drawings but is readily apparent to one skilled in the art as providing a vent when the plenum chamber exceeds the desired amount of pressure which is usually several inches of water column.

Figure 5:
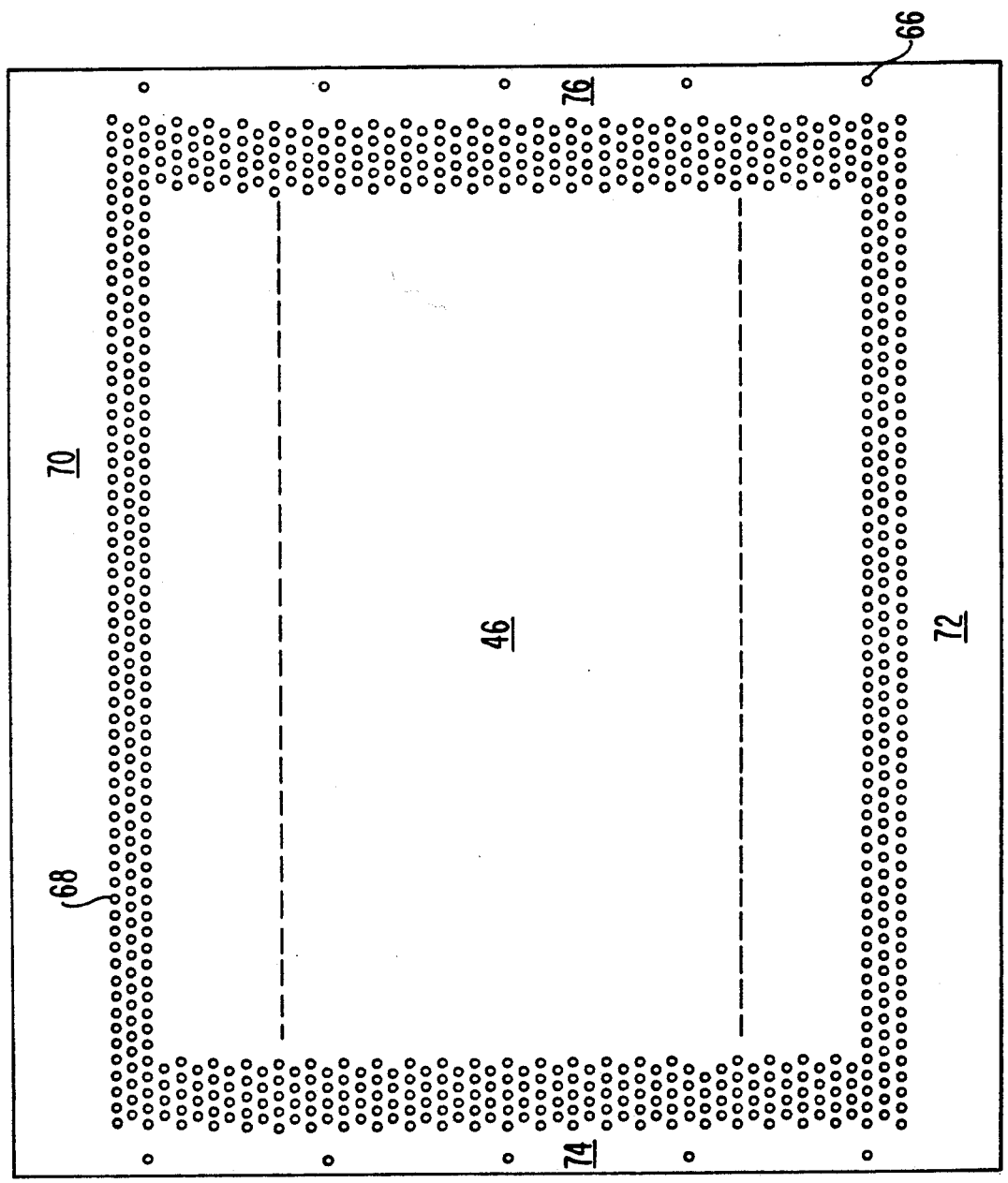
FIG. 5 shows a view of the perforated plate used to support the conveyor belt.

The perforated deckplate 46 is best shown in FIG. 5. The plate as shown is 34" wide by 32" long with five holes for mounting screws on each side. The perforated area occupies 31" of width by 24" of length, leaving approximately 10½" of unperforated edge on each side and approximately 3" of unperforated edge at the beginning and at the end. The width is occupied by 62 spaces on ½" centers which permits 63 holes of ¼" diameter and 62 holes offset alternatively approximately ¼" as shown.

The length of the perforated area occupies 48 spaces on ½" centers which permits 49 rows of equally spaced ¼" holes as shown. While the center of the plate in FIG. 5 is not shown as being perforated, this is merely for drafting simplicity as the entire central area is perforated in the manner just described. Thus, the perforated deckplate 46 has numerous perforations 68, mounting holes 66, a lead in unperforated border 70, an exit unperforated border 72, and two side unperforated borders 74 and 76.

On each side of the perforated deckplate 46, are rounder support risers 92 to support the rounder bar cross from the supports 26. The rounder support risers are supported on side belt guides 94.

The dimensions are such that the conveyor belt 32 covers completely the perforations 68 and thus offers a resistance to the pressurized air flowing from the plenum chamber 48 through the perforations. Only the belt prevents the air from escaping from the perforations and so as it does escape, it leaks out along the edge of the belt and the amount of air leaking is desirable since it carries away the small amount of heat that is built up by friction. In use, the air escaping from the plenum chamber through the perforations under the conveyor belt forms a thin air bearing in the order of 0.002–0.003" thick by estimation. The actual thickness is not readily determined since it varies. This is especially true at the point where the rounding bars contact the belt as they press the belt down closer to the steel deckplate so as to insure a close fit between the bottom of the rounding bars and the conveyor belt. There may be a light kissing of the belt to the perforated deckplate underneath the rounder bars, but it is believed there is usually a thin film of air present. This is substantially thinner than the air under the remainder of the conveyor belt. This combination of the relatively frictionless support provided by the air film under the conveyor belt and on top of the perforated deckplate, plus the escaping air that is carrying away heat, are the design features that serve to keep the temperature rise of the conveyor belt to such a small amount.

The rounder bar assembly, triangular plenum chamber, conveyor belt and drive mechanism may be pivoted about cantilevered pipe or tubular support 50 as best seen in FIG. 3.

The design of the arrangement shown in the preferred embodiment permits pivoting of plus or minus 7 degrees. This is an important features and provides a means of fitting the apparatus to various machines that are being used for subsequent operations. Some of the machines that the invention may be used with could be 30–40 years old and are at slightly different heights. Such a tilted or pivoted arrangement is shown in FIG. 1 that connects a more elevated dough delivery extruder and cutter 12 to a subsequent operation where a lower elevation is preferred.

In order to accommodate the tilting or pivoting of the assembly the gear motor 36 is mounted on a mounting plate 76 which is carried at one end at a pivotal connection through rubber bushing 78, which in turn is carried by mounting bracket 80 which is attached to frame upright 20.

As the assembly pivots about cantilevered pipe 50, the bottom portion moves relative to the frame as the drive roller 34 and gear motor 36 moves. The center line of the drive roller has to move in a radius about the pivot point of the cantilevered pipe support 50. When it does, that moves the position of the gear motor which movement is permitted by loosening the mounting screws 82 on the mounting plate 76 to permit the gear motor to slide on the mounting plate to the new position at which point the mounting screws are retightened. The mounting screws are mounted in slots (not shown) in the mounting plate 78 that permits the sliding movement when the screws are loosened. Also, there will be a slight pivoting of the mounting plate 76 to the new position which pivoting is permitted by the pivoted connection to the rubber bushings 78 as indicated earlier.

At the discharge end of the apparatus, there is provided a stripper roller 84 which is preferably a 2" diameter plastic roller upon which a portion of flour from the flour sifter is applied. The stripper roller has an auxiliary drive motor 86. The purpose of the power driven stripper roller 84 is to insure that a dough piece which may be sticky separates from the surface of the conveyor belt when it discharges off at the end. This provides assurance that an occasional dough piece does not stick to the belt and double back and follow the belt around.

Also, a scraper 88 is provided near the bottom of the apparatus so that any dough that sticks to the slick belt is removed from the belt by the lateral scraper which extends from one side of the belt to the other. The scraper 88 is positioned close to the radius of the drive roll and as it scrapes the dough off, it falls into a catch pan which is not shown but is located in the bottom of the frame 26. Thus, there has been described a preferred embodiment of the invention which discloses a dough rounder that is able to handle the high through put of current production lines which is only of small length wise dimensions but yet able to hold its temperature down to only small rises by the use of a special air bearing which reduces the friction and carries away heat build up. The apparatus is readily adopted by a unique arrangement for tilting the unit to different inlet and outlet heights and accommodates dough pieces that have not been oiled on their surface.

It is to be understood that the following claims are intended to cover all of the generic and specific features of the invention herein described and it is to be understood that this specific embodiment herein shown is not to be construed in the limiting sense but is merely to depict and illustrate the principles of the present invention. Modifications may be devised by those with skill in the art which will not depart from he spirit or scope of protection as set forth in the following claims:

What is claimed is:

1. A dough shaping machine comprising:
   an air impervious endless flexible belt for conveying dough pieces past a dough shaper;
   a drive roll for driving said belt;
   a perforated plate having perforations lying under said belt for partially supporting said belt against forces applied thereto; and
   a plenum chamber adjacent said perforated plate for enclosing air under pressure which is free to leak out through said perforated plate except to the extent it is blocked from leaking by said belt blocking said perforations whereby said air leaks out between said perforated plate and said belt to reduce the friction therebetween and carry away heat from friction heat generated.

2. The dough shaping machine of claim 1 wherein:
   said machine shapes dough pieces by rounding them into a sphere and includes at least one dough rounder bar adjacent said belt.

3. The dough shaping machine of claim 2 wherein:
   said rounder bar includes an adjustment mechanism that causes the rounder bar to be adjusted relative to said belt so as to be in contact therewith.

4. The dough shaping machine of claim 3 wherein:
   said belt is supported by two idler rolls and on drive roll in a triangular pattern of movement having three sides with one side being substantially flat and supported in part by said perforated plate.

5. The dough shaping machine of claim 4 wherein:
   said plenum chamber is shaped broadly to fit within the space enclosed with the triangular movement pattern of said belt.

6. The dough shaping machine of claim 5 wherein:
   said perforated plate has a border around said perforations which has no air leaking perforations with a substantial part of said border lying under said impervious belt.

7. The dough shaping machine of claim 1 wherein:
   said belt, said drive roll, said perforated plate and said plenum chamber are supported as a unit by a horizontal shaft about which said unit is free to pivot.

8. The dough shaping machine of claim 4 wherein:
   said belt, said drive roll, said perforated plate and said plenum chamber are supported as a unit by a horizontal shaft about which said unit is free to pivot.

9. The dough shaping machine of claim 8 wherein:
   said machine includes a frame having an upright support with said horizontal shaft cantilevered from said upright support.

10. The dough shaping machine of claim 9 wherein:
    a power source platform is pivoted to said upright support;
    a power source for driving said drive roll is adjustably attached to said power source platform; and
    an adjustment is included to permit said power source to be adjusted to accommodate the pivoting of said unit.

11. The dough shaping machine of claim 10 wherein:
    said drive roll is mounted on adjustable bearings that when loosened permit said belt to be quickly replaced.

12. The dough shaping machine of claim 11 wherein:
    said plenum chamber is shaped broadly to fit within the spaced enclosed within the triangular movement pattern of said belt.

13. The dough shaping machine of claim 12 wherein:
    said perforated plate has a border around said perforations which has no air leaking perforations with a substantial part of said border lying under said impervious belt.

14. The method of shaping a dough piece comprising the following steps:
    making a mass of dough into uniform pieces of equal weight;
    depositing said dough pieces onto an endless air impervious flexible belt;
    conveying by said belt said pieces to a dough shaping apparatus;
    shaping said dough pieces into a desired shape;
    supporting and cooling said belt by a perforated plate deck lying just underneath at least a portion of said belt; and
    discharging air from said perforated plate deck to provide a film of air between said plate deck and said belt to reduce the friction therebetween and to carry away heat from any friction heat generated.

15. The method of claim 14 wherein said belt is driven by roller which include a drive roller and supported by an idle roller and is rapidly replaced by the steps of:
    supplying a horizontally cantilevered shaft support for said belt, said perforated plate, said rollers for driving said belt, and a plenum chamber for said perforated plate;
    supporting said rollers by adjustable bearings;
    loosening said belt by loosening said adjustable bearings;
    removing said belt;
    putting on a new belt; and
    tightening said new belt by tightening said adjustable bearings.

16. The method of claim 15 wherein said dough shaping apparatus is tilted so said perforated deck plate is at an angle to the horizontal comprising the steps of:
    rotating as a unit said belt, said perforated deck plate, said rollers, and said plenum chamber about said horizontally cantilevered shaft until the desired tilt is reached; and
    fastening said unit into the desired position.

* * * * *